United States Patent [19]

Keech

[11] Patent Number: 5,526,179
[45] Date of Patent: Jun. 11, 1996

[54] LIGHT GLARE REDUCING DEVICE

[76] Inventor: Charles A. Keech, 72 Red Lion Ave., Felton, Pa. 17322

[21] Appl. No.: 279,487

[22] Filed: Jul. 22, 1994

[51] Int. Cl.⁶ ............................ G02B 5/02; G02B 21/00; G02B 5/08; B60Q 1/064
[52] U.S. Cl. ............... 359/601; 359/602; 359/603; 359/885; 359/599; 362/61; 362/290; 362/342
[58] Field of Search ..................... 359/601, 602, 359/603, 604, 605, 613, 227, 228, 229, 885, 886, 887, 614, 611, 599, 608; 362/18, 61, 187, 101, 290, 342, 354

[56] References Cited

U.S. PATENT DOCUMENTS

| | | | |
|---|---|---|---|
| 2,031,045 | 2/1936 | Land | 88/1 |
| 2,123,901 | 7/1938 | Land | 359/500 |
| 2,185,000 | 12/1939 | Land | 88/65 |
| 2,237,565 | 4/1941 | Land | 88/65 |
| 2,433,503 | 12/1947 | Young | 88/65 |
| 4,286,308 | 8/1981 | Wolff | 362/19 |
| 4,707,767 | 11/1987 | Bergin et al. | 362/61 |
| 4,944,125 | 9/1994 | Ito | 359/886 |
| 5,131,736 | 9/1994 | Alvarez | 359/886 |
| 5,262,902 | 9/1994 | Okumuya et al. | 359/885 |

*Primary Examiner*—Paul M. Dzierzynski
*Assistant Examiner*—Mohammad Y. Sikder
*Attorney, Agent, or Firm*—Michael D. Bednarek; Marks & Murase

[57] ABSTRACT

A sealed compartment of compartments being all or partially constructed of light transmitting materials with light reflecting surfaces in different designs. The compartments are substantially filled with a diffusing light transmitting medium. When the filled compartments are placed over lighting sources they reduce the high glare and blinding effects of the light sources. Increasing the light output of lighting sources when used with compartments can maintain the lighting level while reducing glare. When used for automotive usage alternative automotive headlights are used. The combined usage of the alternative headlights and the compartments provides roadway and side of the roadway lighting without high glare to oncoming vehicles, bicyclists, pedestrians and animals. The existing automotive headlight system can be maintained so that the high beam headlights can be used if necessary or desirable.

19 Claims, 9 Drawing Sheets

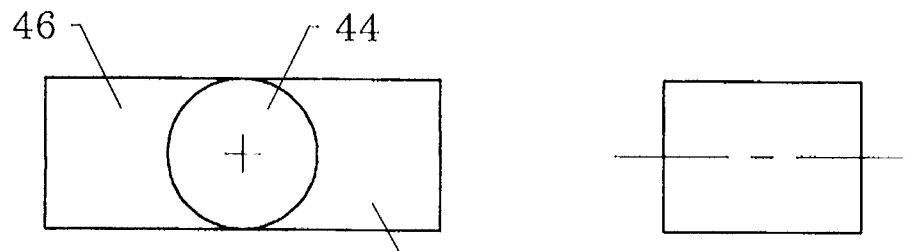
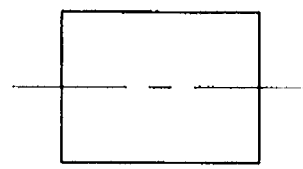
FIGURE 9        FIGURE 10
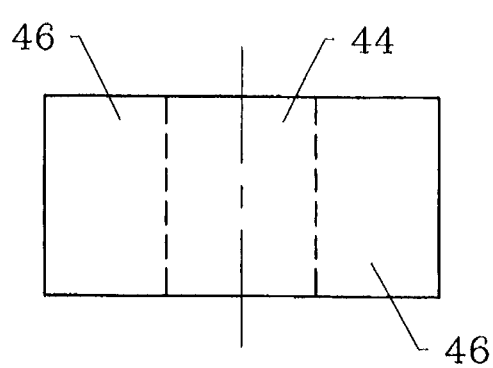
FIGURE 11
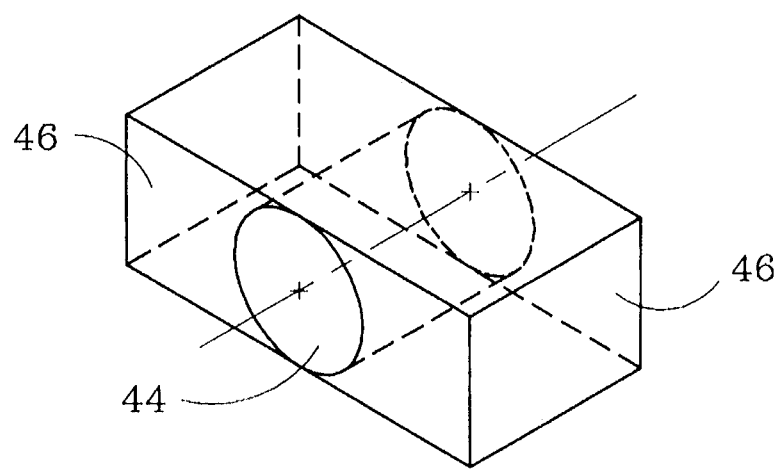
FIGURE 12

LIGHT GLARE REDUCING DEVICE

BACKGROUND

1. Field of Invention

This invention relates to a new and improved light glare reducing device and more specifically a glare control device for illuminating vehicle pathways and other illumination.

2. Description of Prior Art

Headlight glare is a persistent safety hazard in night driving and over the years many systems have been proposed to suppress headlight glare.

In general, the prior art systems fall into two broad categories. In the first, polarizing filters placed over the headlights polarize the emitted light at a 45 degree axis and a similar polarizing filter is used as a visor through which the operator views the roadway. When a similarly equipped vehicle approaches, the light emitted there-from is crosspolarized with respect to the visor thereby reducing glare. For such a system to be effective, however, it must be adopted universally. Representative examples of the polarizing system may be found in U.S. Pat. Nos. 1,786,518; and 2,423,321. Also see commonly-assigned U.S. Pat. No. 2,458,179.

The second type of glare control system may be referred to as the strobe type. In the strobe system, the headlight is rapidly flashed on and off, either electrically by interrupting power or electromechanically by providing an oscillating or rotating shutter in front of the headlights, and the operator views the roadway through a visor that is rapidly switched between light transmissive and opaque states in synchronism with the headlights. The headlights operate above the eye flicker rate and generally are on for a very short portion of the headlight cycle. For example, the headlight may be turned on for 10 per cent of the cycle and be off for 90 per cent. The visor is transmissive while the headlight is on and then is rapidly switched to the opaque state while the headlight is off. Obviously, the light output of the headlight must be 10 times greater than normal to provide sufficient illumination. Because the visor is transmissive for only 10 per cent of the visor cycle, headlight glare from oncoming vehicles is reduced by 90 per cent. Despite the complexity of the strobe system, it has a major advantage in the fact that it need not be universally adopted to provide the benefit of glare suppression.

For representative examples of early strobe type systems, reference may be had to U.S. Pat. Nos. 2,131,888; 2,139,707; and 2,755,700. A more contemporary version of the strobe type glare reduction system may be found in The National Highway Traffic Safety Administration Report PB-257-431 of September 1976 entitled "Advanced Headlighting Systems". The visor used in that system is of the electro-optical type, such as the PLZT shutter described in U.S. Pat. No. 3,245,315.

While both the polarizing and strobe type glare control systems are effective to reduce glare, the inherent light transmission losses of those systems generally tend to deprive the vehicle operator of the benefit of supplemental ambient illumination provided by streetlights especially when there is no vehicle approaching or when the glare intensity is relatively low from oncoming vehicles off in the distance.

The polarizing system described in the previously noted U.S. Pat. No. 2,230,262 addresses the problem by configuring the headlight and visor filters in venetian blind arrays that are switched between closed and opened positions in accordance with the glare intensity of the oncoming path as measured by a photoelectric glare level detector mounted on the front of the automobile. When the glare level is above a predetermined limit, the filters are closed for maximum glare reduction. When the glare intensity falls below the limit, the filters are opened to take advantage of ambient illumination. However, because this is a bistable system (the filters are either opened or closed) which does not adjust proportionally to variations in glare intensity, it would seem that the abrupt changes in perceived roadway illumination may prove tiring to the vehicle operator.

The strobe type systems in the prior art generally do not make any provision for varying the system response in accordance to glare intensity and the transmissive-to-opaque time ratio of the visor cycle is fixed to coincide with the light emitting and nonemitting intervals of the headlight cycle for maximum glare reduction.

The glare control system for reducing headlight glare from oncoming vehicles being of the type wherein the headlights are rapidly switched between light emissive and non-emissive states and the operator views the roadway through a visor operating in synchronism with the headlights and being switchable between light transmissive and opaque states could have technical difficulties when approached by two vehicles with different light emissive and non-emissive states.

Previous methods for reducing headlight glare have generally been complex.

Generally, previous glare reducing systems have no effect on headlight glare reflected by the vehicles mirrors from following vehicles.

Automotive headlights over the years have been improved with better lighting for the driver and with each improvement for the driver it has brought with it more glare and blinding effects to approaching drivers.

Today headlight glare is still a persistent safety hazard in night driving despite the many systems that have been proposed over the years to suppress headlight glare indicating the systems are either technically unfeasible, impractible or unsound or lacking in commercial potential.

OBJECTS AND ADVANTAGES

Accordingly, several objects and advantages of my invention are:

(a) to provide an improved construction and arrangement of parts for reducing glare from an automotive headlight system and similar sources of light in an efficient and economical manner.

(b) to provide a means for diminishing or eliminating the glare from sources of illumination by interposing between a light source and the person viewing said source a diffusive light transmitting suspension, suspended solution or mixture of particle or substance suspending fluids, airs or gases.

(c) to provide a means in connection with a new automotive headlight system and the like for the projection of two light components from each headlight, one component being projected as that portion of the beam illuminating the roadway path of the vehicle, the other component being projected as a spread beam to illuminate the sides of the roadway.

(d) to provide a manner in which headlight glare is substantially reduced, as the only components remaining visible to an approaching driver and his or her passengers is the soft, low-glaring components of the emitted beam.

(e) to provide adequate roadway illumination.

(f) to provide a wider field of light for more side of the road illumination.

(g) to provide more side of the road illumination to provide better vision for seeing bicyclists, pedestrians, animals and other objects.

(h) to provide glare reduction to oncoming vehicles traveling along an adjacent path.

(i) to provide glare reduction to oncoming vehicles traveling in any and all directions.

(j) to provide glare reduction to vehicles being followed because high glare will not be present to be reflected by the lead vehicle mirrors.

(k) to provide glare reduction to bicyclists, pedestrians and animals.

(l) to provide a low glare automotive headlight system to reduce for passing motorists the temporary blindness or impaired or restricted vision that occurs when passing a vehicle in the opposing direction with high glare headlights.

(m) to provide a low glare automotive headlight system that is self-contained, that does not require parts to be installed on other vehicles.

(n) to provide a low glare automotive headlight system that does not have to be used universally to be effective.

(o) to provide a low glare automotive headlight system where universal usage could be adapted over a period of time.

(p) to provide a low glare automotive headlight system that does not cause abrupt changes in roadway illumination.

(q) to provide a low glare automotive headlight system that utilizes no moving parts.

(r) to provide a low glare automotive headlight system that utilizes no electronic components.

(s) to provide a low glare automotive headlight system that utilizes no visors in the system.

(t) to provide a low glare automotive headlight system that the headlights do not have to be switched on and off constantly as in some previous systems.

(u) to provide a low glare automotive headlight system that the output of headlights used does not have to be increased 10–20 times as in some prior art.

(v) to provide a low glare automotive headlight system that is simple in its operation.

(w) to provide a low glare automotive headlight system that is relatively simple to install.

(x) to provide a low glare automotive headlight system that does not deprive the vehicle operator of the benefit of supplemental ambient illumination provided by streetlights or other sources of illumination.

SUMMARY OF THE INVENTION

The present invention provides an improved light glare reducing device usable on any automobile or other vehicle or other similar spot like illumination light or other illumination lights.

The present invention reduces headlight glare to oncoming vehicles traveling along an adjacent path of travel as well as any and all vehicles traveling in any and all other directions as well as to bicyclists, pedestrians and animals. These advantages are achieved according to the present invention, which comprises a light glare reducing device adapted to be placed in the path of light emitted from a light source. The glare reducing device includes a compartment with a plurality of light transmitting surfaces. The compartment substantially filled with a diffusive light transmitting suspension, suspended solution or mixture of particle or substance suspending fluids, airs or gases.

BRIEF DESCRIPTION OF THE DRAWINGS

The foregoing system is subject to considerable variation without departing from within the scope of the invention.

Additional objects and advantages will in part appear and in part be pointed out in the course of the following detailed description of certain embodiments of the invention, which are given as nonlimiting examples, reference should be had to the following detailed description taken in connection with the accompanying drawings in which:

FIG. 9 shows a front view of a single unit of a projected final product.

FIG. 10 shows a side view of a single unit of a projected final product.

FIG. 11 shows a top view of a single unit of a projected final product.

FIG. 12 shows a perspective view of a single unit of a projected final product.

Figure 1:
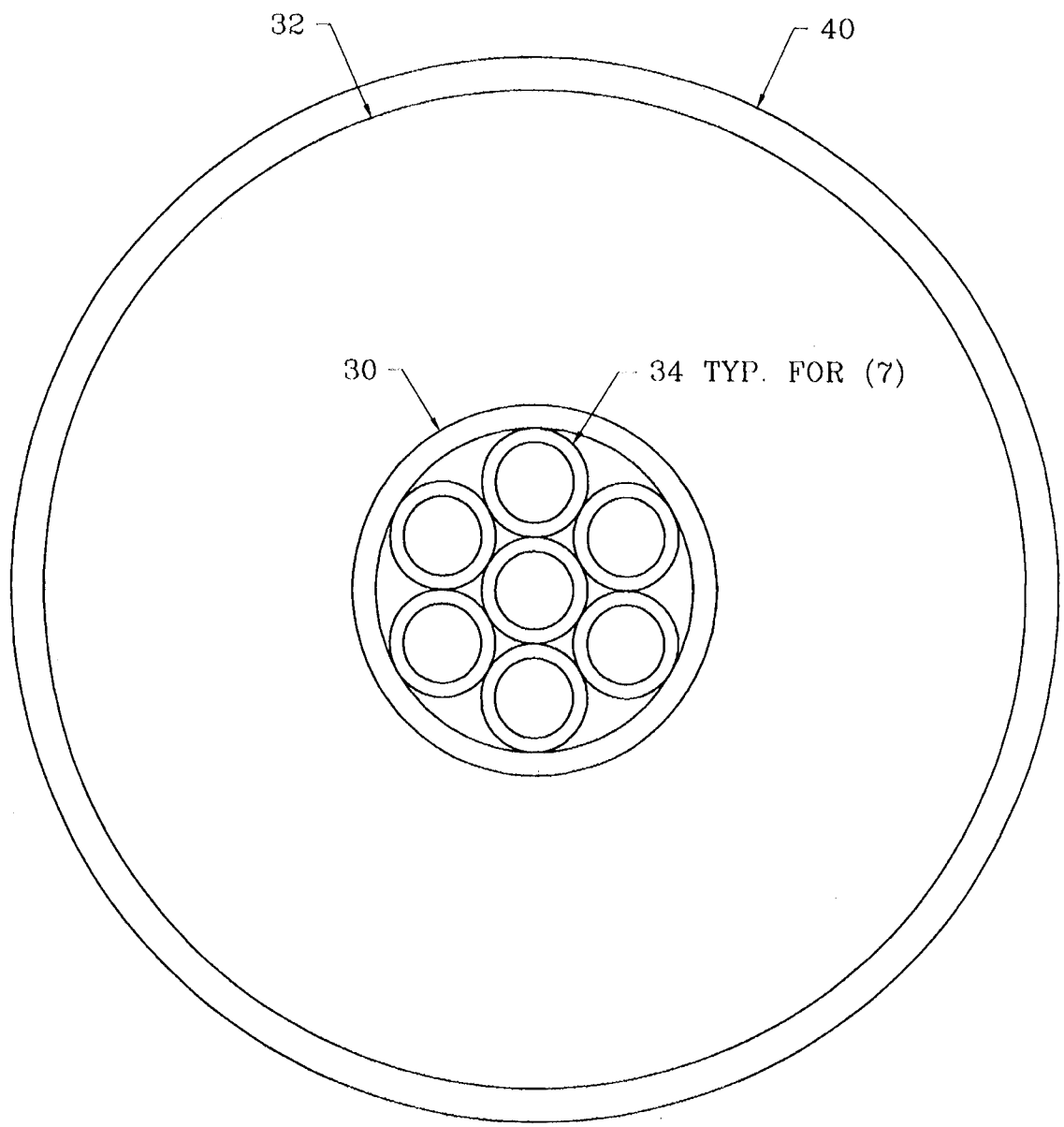
FIG. 1 shows a front view of a single unit of a prototype test model.

| Reference Numerals In Drawings | |
|---|---|
| 30 inner cylinder | 32 outer cylinder |
| 34 tubes | 36 inner cylinder face plate |
| 38 outer cylinder face plate | 40 prototype test model unit |
| 42 inner and outer cylinder rear plate | |
| 44 inner cylinder compartment | 46 outer cylinder compartment |
| 48 holes | 50 cork |
| 52 headlight | 54 light source end |
| 56 protective designer shield | 58 electrical connection |
| 60 light bulb | 62 light reflector shield |

DETAILED DESCRIPTION OF INVENTION

Figure 2:
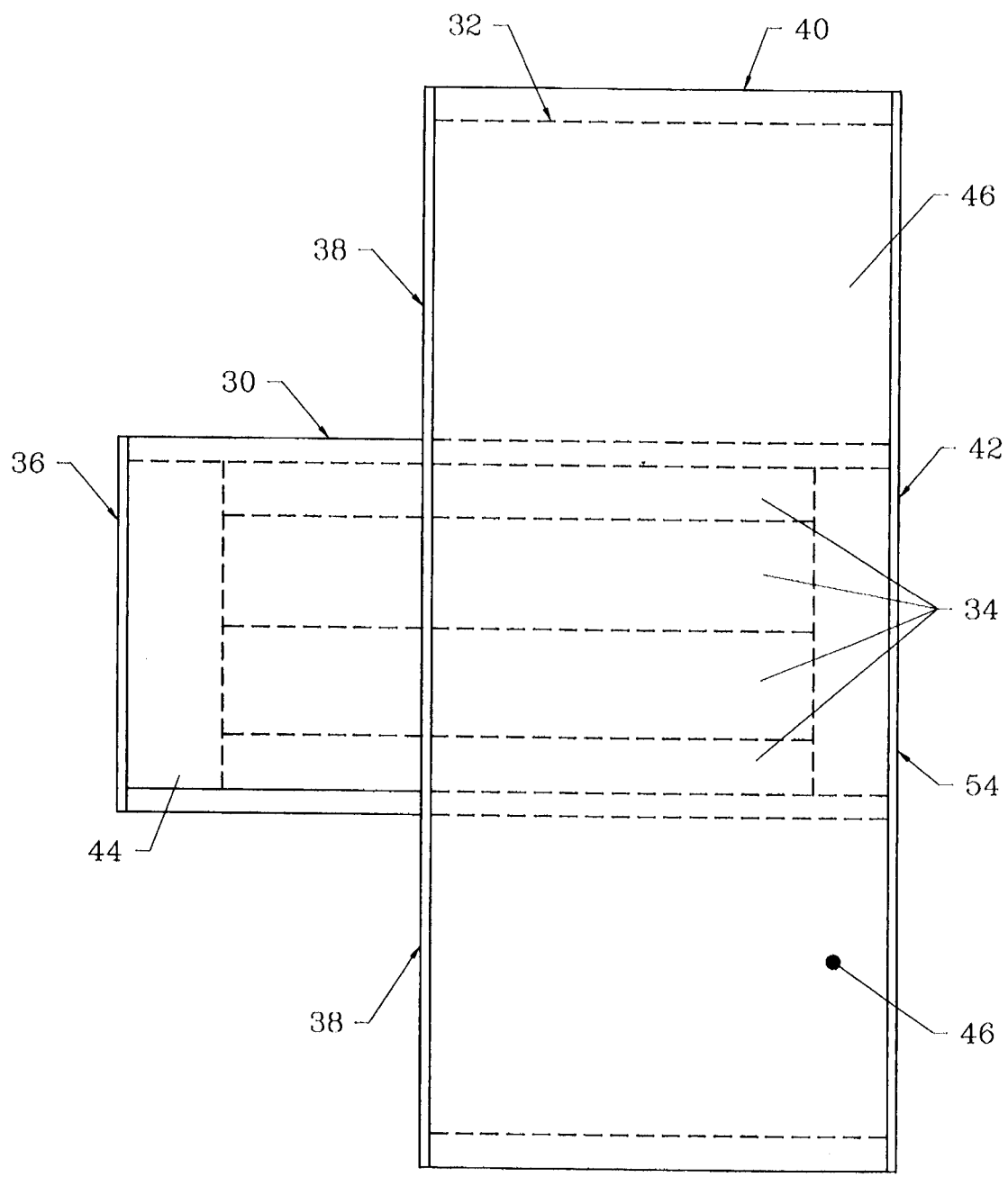
FIG. 2 shows sides, bottom and top views of a single unit of a prototype test model.
Figure 3:
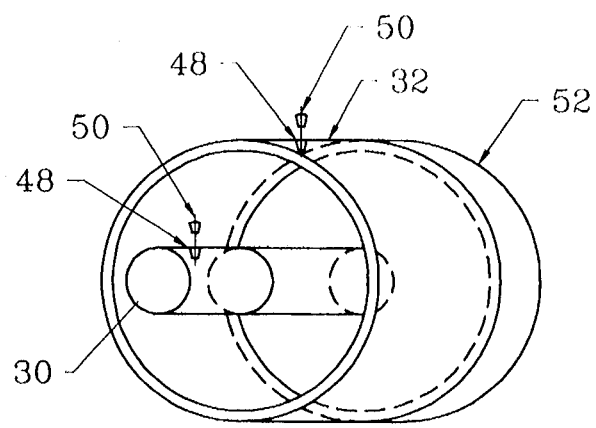
FIG. 3 shows a perspective view of a single unit of a prototype test model.

FIG. 1 shows a front view, FIG. 2 shows side, bottom and top views and FIG. 3 shows a perspective view of a single unit of prototype test model 40.

Tubes 34 are seven pieces of common one-half inch inside diameter white plastic or PVC water pipe that are glued, joined or secured together in a configuration of two pieces on the bottom, three pieces in the middle or on top of the two bottom pieces and two pieces on the top or on top of the middle or second layer. The seven pieces of tubes 34 are glued tightly together with their ends all even. In prototype test model 40 tubes 34 are four inches in length.

Inner cylinder 30 is a common two inch inside diameter white plastic or PVC water pipe which contains seven tubes 34. In prototype test model 40 inner cylinder 30 is five inches in length.

Tubes 34 are glued to the inside bottom of inner cylinder 30 slightly off the front to rear center towards the rear of inner cylinder 30.

Outer cylinder 32 is a common six inch inside diameter white plastic or PVC water pipe. In prototype test model 40 outer cylinder 32 is three inches in length.

Inner and outer cylinder rear plate 42 is a common piece of one-eighth inch thick clear light transmitting material (e.g., a common synthetic resin material such as PLEXIGLASS can be used) cut in a circular shape and size fitting the outside diameter of outer cylinder 32.

The rear end of inner cylinder 30 is glued in a centered position to one side of inner and outer cylinder rear plate 42.

All glued areas should and must create an air, water or fluid sealed tight joint.

Outer cylinder 32 is glued, outside of inner cylinder 30, to the outer edges of inner and outer cylinder rear plate 42. Outer cylinder 32 is glued to the same side of inner and outer cylinder rear plate 42 as inner cylinder 30.

All glued areas should and must create an air, water or fluid sealed tight joint.

Outer cylinder face plate 38 is a common piece of one-eighth inch thick clear light transmitting material (e.g., a common synthetic resin material such as PLEXIGLASS can be used) cut in a circular shape and size fitting the outside diameter of outer cylinder 32. The center of the or outer cylinder face plate 38 is cut out in a circular shape and size fitting the outside diameter of inner cylinder 30 to allow inner cylinder 30 to protrude through outer cylinder face plate 38.

Outer cylinder face plate 38 is slid over the front end of inner cylinder 30 and the outer edge is glued to the front end of outer cylinder 32. The inner edge or the center circular cut shape and size fitting is securely glued to the outside diameter of inner cylinder 30.

All glued areas should and must create an air, water or fluid sealed tight joint.

The installation of outer cylinder face plate 38 creates outer cylinder compartment 46. Outer cylinder compartment 46 is an enclosed and sealed space that is enclosed on the top, sides and bottom by outer cylinder 32 and that is enclosed on the inner side by the outer surface of inner cylinder 30 and that is enclosed on the front side by outer cylinder face plate 38 and that is enclosed on the rear side by inner and outer cylinder rear plate 42.

Inner cylinder face plate 36 is a common piece of one-eighth inch thick clear light transmitting material (e.g., a common synthetic resin material such as PLEXIGLASS can be used) cut in a circular shape and size fitting the outside diameter of inner cylinder 30.

Inner cylinder face plate 36 is securely glued on the outside edges to the front end of inner cylinder 30 creating an air, water or fluid sealed tight joint.

The installation of inner cylinder face plate 36 creates inner cylinder compartment 44. Inner cylinder compartment 44 is an enclosed and sealed space that is enclosed on the top, sides and bottom by inner cylinder 30 and that is enclosed on the front end by inner cylinder face plate 36 and that is enclosed on the rear end by inner and outer cylinder rear plate 42 and that contains seven tubes 34 which are securely attached inside inner cylinder 30 in a position slightly off center towards the rear of inner cylinder 30.

All glued areas should and must create an air, water and fluid sealed tight joints.

On prototype test model 40 a hole 48 is placed or drilled in the top of inner cylinder 30 between tubes 34 and inner cylinder face plate 36.

On prototype test model 40 a hole 48 is placed or drilled in the top of outer cylinder 32 near the front of outer cylinder 32.

The aforementioned holes 48 are used to fill inner cylinder compartment 44 and outer cylinder compartment 46 with a diffusive light transmitting suspension, suspended solution or mixture of particle or substance suspending fluids, airs or gases.

In prototype test model 40 a solution of one-eighth teaspoon of Havoline Outboard Two-Cycle Engine Oil mixed with sixteen ounces of seventy per cent isopropyl rubbing alcohol is placed and used in inner cylinder compartment 44.

In prototype test model 40 a solution of three teaspoon of Liquid Gold furniture polish mixed with twenty-four ounces of seventy per cent isopropyl rubbing alcohol is placed and used in outer cylinder compartment 46.

Since certain changes may, can and will be made in the above solutions or diffusive light transmitting suspension, suspended solution or mixture of particle or substance suspending fluids, airs or gases without departing from the scope of the invention herein involved, it is intended that all matter contained in the above solution descriptions and solutions shall be interpreted as illustrative and not in a limiting sense.

When filled, inner cylinder compartment 44 and outer cylinder compartment 46 are sealed with a common cork 50 in prototype test model 40. During any actual manufacturing process cork 50 would not be used. Liquid or fluid solutions could be placed in inner cylinder compartment 44 and outer cylinder compartment 46 before inner cylinder face plate 36 and outer cylinder face plate 38 are installed to eliminate holes 48 as well as corks 50.

Headlight 52 is placed at the rear end, light source end 54, of prototype test model 40 in such a way and manner that the illumination from headlight 52 is directed directly at and into the rear end, light source end 54. The illumination light from headlight 52 passes through inner cylinder compartment 44 and outer cylinder compartment 46.

Prototype test model 40 uses a 100 watt fog light as a headlight 52. Examples are a Wagner number 4537 and a GE number 4537-2 bulbs.

Since certain changes may, can and will be made in the aforementioned solutions or diffusive light transmitting suspension, suspended solution or mixture of particle or substance suspending fluids, airs or gases without departing from the scope of the invention herein involved and therefore different illumination requirements may be needed, it is intended that all matter contained in the above headlight 52 description shall be interpreted as illustrative and not in a limiting sense.

Figure 4:
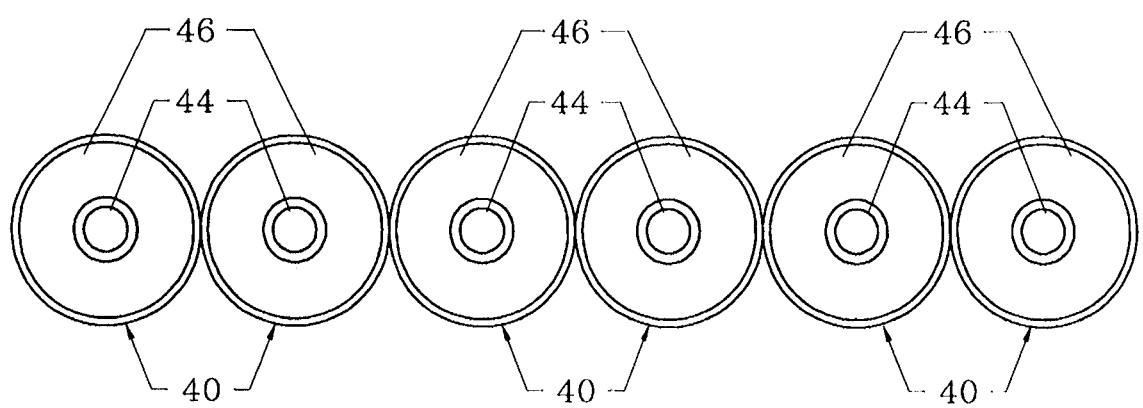
FIG. 4 shows a front view of a six unit prototype test model.
Figure 5:
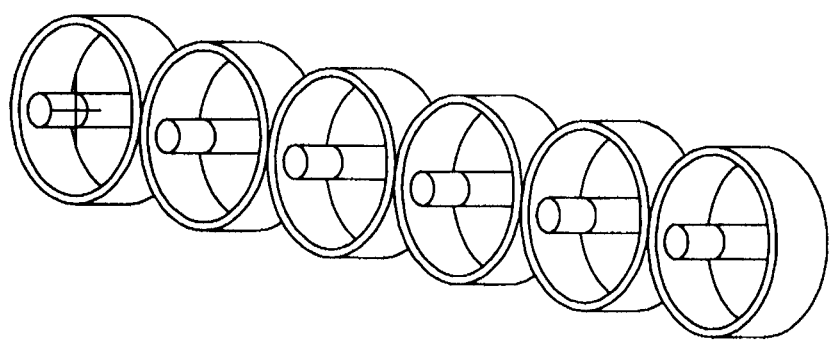
FIG. 5 shows a perspective view of a six unit prototype test model.

FIG. 4 shows a front view and FIG. 5 shows a perspective view of the six unit prototype test model 40. The six unit prototype test model 40 consists of six single unit prototype test models 40 placed in a side by side manner to form a straight line of units.

Since certain changes may, can and will be made in the aforementioned solutions or diffusive light transmitting suspension, suspended solution or mixture of particle or substance suspending fluids, airs or gases without departing from the scope of the invention herein involved and therefore different illumination requirements may be needed, it is intended that all matter contained in the above number of single unit prototype test models 40 units shall be interpreted as illustrative and not in a limiting sense.

Figure 6:
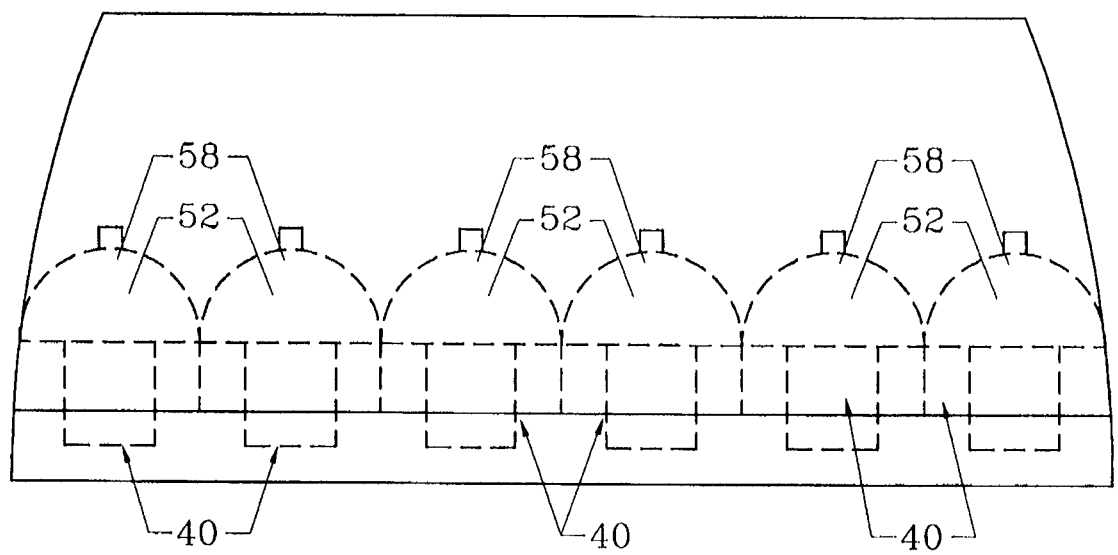
FIG. 6 shows a top view of a six unit prototype test model with a protective designer shield.
Figure 7:
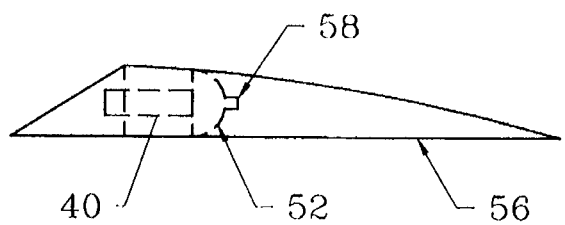
FIG. 7 shows a side view of a six unit prototype test model with a protective designer shield.
Figure 8:
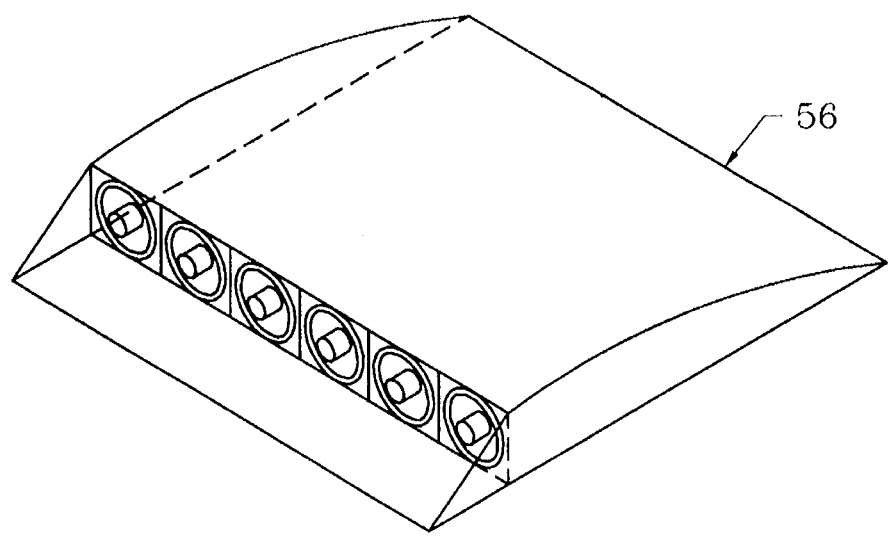
FIG. 8 shows a perspective view of a six unit prototype test model with a protective designer shield.

FIG. 6 shows a top view, FIG. 7 shows a side view and FIG. 8 shows a perspective view of the protective designer shield 56. The protective designer shield 56 is a plastic, fiberglass or other material outer cover protecting the prototype test models 40, headlights 52, electrical connections 58 and a wiring harness while providing a support unit or system to hold everything together in alignment and adjustment.

A wiring harness would be connected to each headlight 52. The wiring harness would then exit the protective designer shield through a water tight grommet or fitting. The wiring harness would then pass through a protective shield or casing that would run from the roof of the vehicle and then down the front roof post beside the windshield in a front engine vehicle. In a rear engine vehicle the wiring harness and its protective shield or casing would go to the rear engine compartment. The wiring harness would pass into the engine compartment through a protective device to keep the wiring harness from becoming squashed, frayed or damaged in any way. One wire of the wiring harness would be connected to one terminal of the battery while the other wire of the wiring harness would run through a switch accessible to the driver of the vehicle and then on to the other terminal of the battery.

FIG. 9 shows a front view, FIG. 10 shows a side view, FIG. 11 shows a top view and FIG. 12 shows a perspective view of a single unit of a projected final product. The projected final product reflects projected improvements in diffusive light transmitting suspension, suspended solution or mixture of particle or substance suspending fluids, airs or gases with the utilization of different headlight 52 designs and improved and simplified manufacturing processes, techniques and the like.

Figure 13:
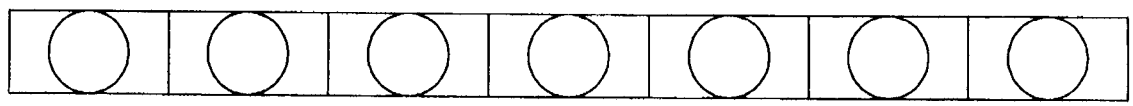
FIG. 13 shows a front view of a six unit projected final product.
Figure 14:
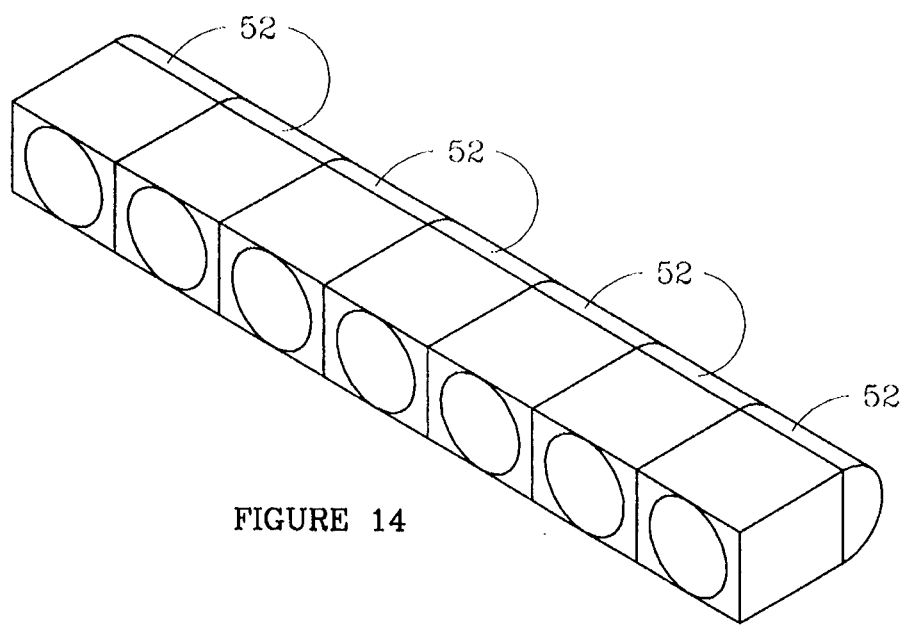
FIG. 14 shows a perspective view of a six unit projected final product.

FIG. 13 shows a front view and FIG. 14 shows a perspective view of a six unit projected final product. Since this is a projected final project the actual final product may contain more or less units.

Figure 15:
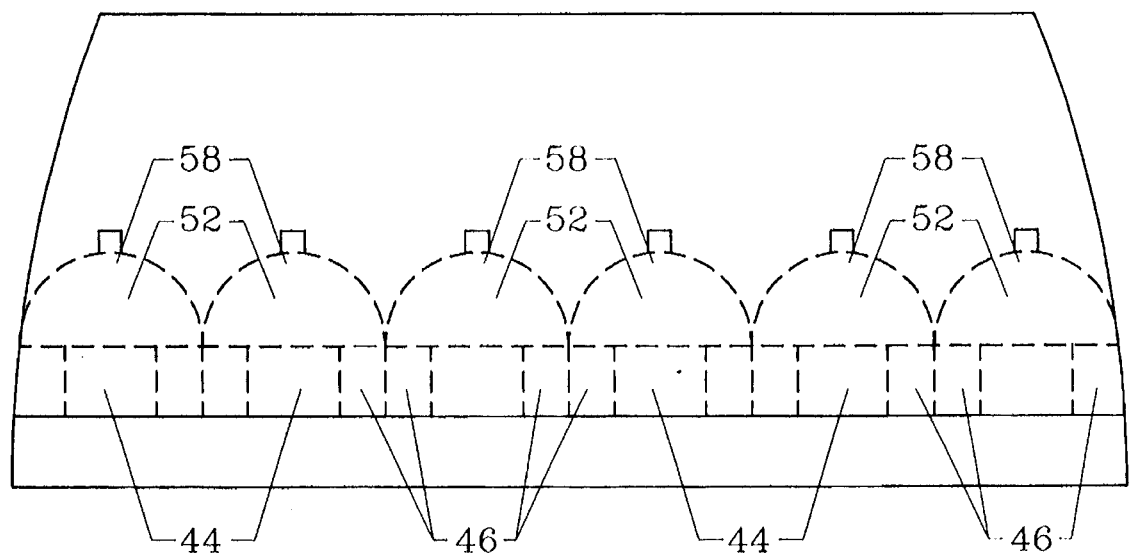
FIG. 15 shows a top view of a six unit projected final product with a protective designer shield.
Figure 16:
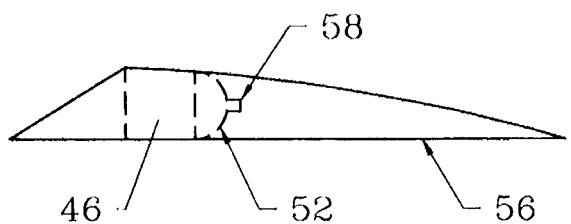
FIG. 16 shows a side view of a six unit projected final product with a protective designer shield.
Figure 17:
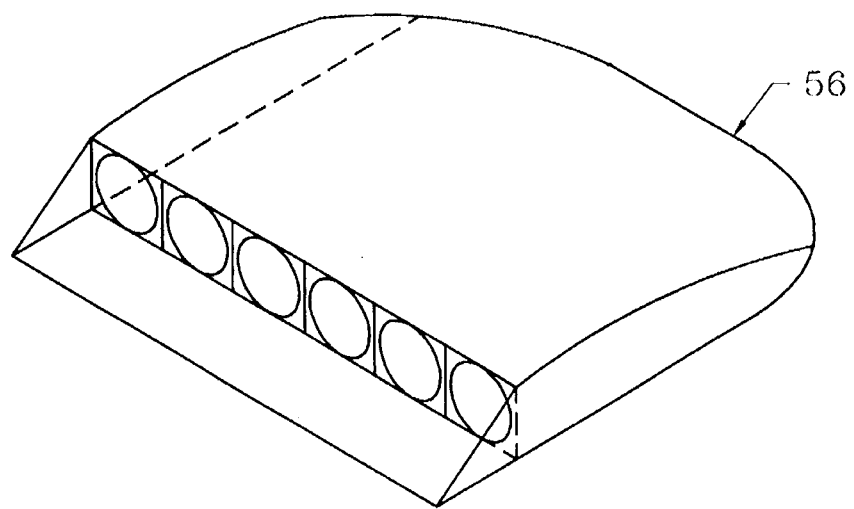
FIG. 17 shows a perspective view of a six unit projected final product with a protective designer shield.

FIG. 15 shows a top view, FIG. 16 shows a side view and FIG. 17 shows a perspective view of the projected final product with a protective designer shield 56. This protective designer shield 56 reflects adaptation to a projected final product over the prototype test model 40.

Figure 18:
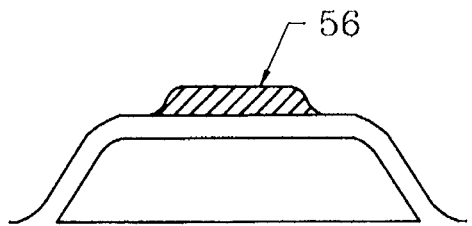
FIG. 18 shows a side view of a six unit projected final product mounted on a vehicle roof, designated by the hatching area.
Figure 19:
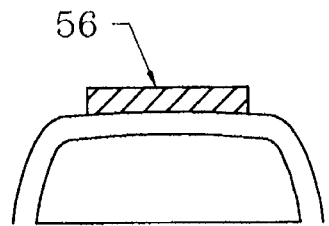
FIG. 19 shows a front view of a six unit projected final product mounted on a vehicle roof, designed by the hatching area.

FIG. 18 shows a side view and FIG. 19 shows a front view of a six unit projected final product mounted on a vehicle roof and designated by a hatching area. The views demonstrate how a product can be designed to fit the roof contours of individual vehicle designs to provide an attractive streamline appearance and be designed for low wind resistance.

Figure 20A:
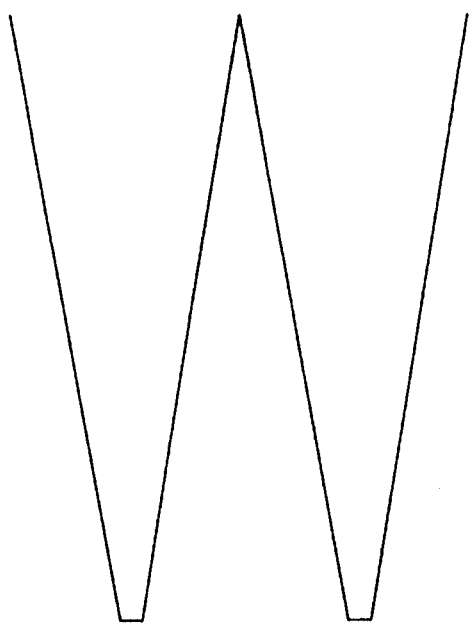
FIGS. 20A and 20B, respectively, show top views of light projections of two headlights and a six unit prototype test model.
Figure 20B:
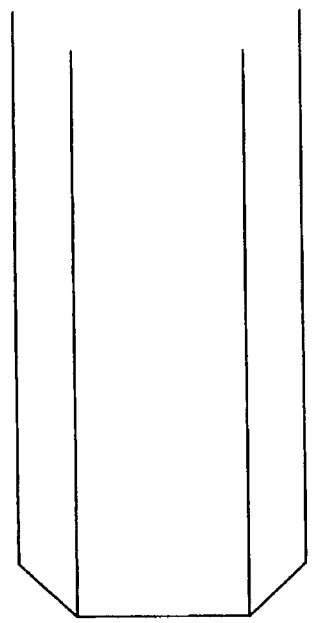

FIGS. 20A and 20B, respectively, show top views of light projections of two headlights 52 and a six unit prototype test unit 40 as tested. The light projections could vary somewhat depending upon any and all changes in solutions or diffusive light transmitting suspension suspended solution or mixture of particle or substance suspending fluids, airs or gases and by any and all changes in illumination sources or headlights 52 and by any and all changes or modifications in designs.

Figure 21:
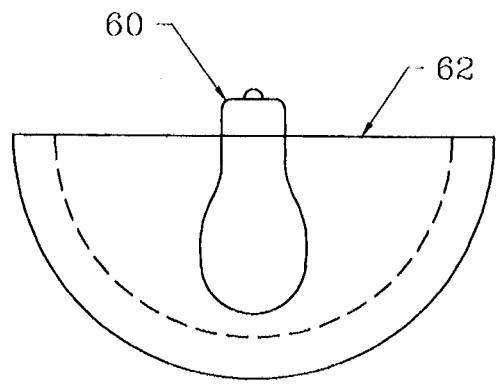
FIG. 21 shows a cutaway side view of a modification of a light glare reducing device adapted to a street light or other light source.
Figure 22:
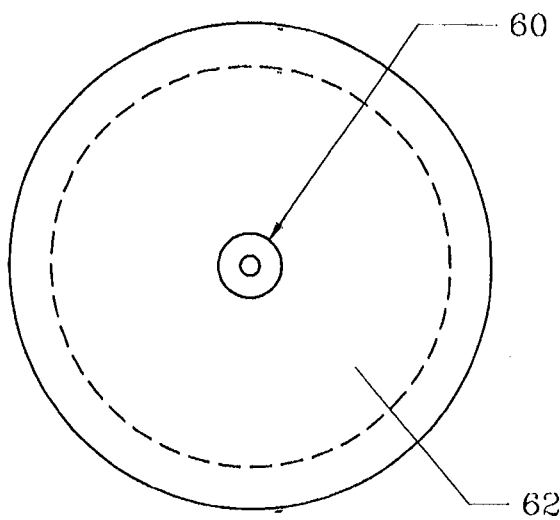
FIG. 22 shows a top view of a modification of a light glare reducing device adapted to a street light or other light source.
Figure 23:
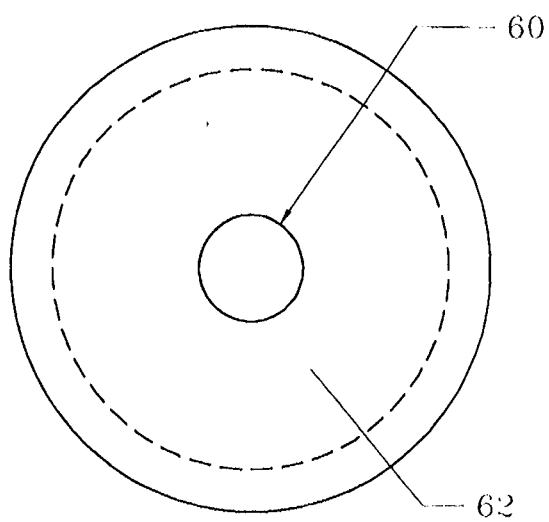
FIG. 23 shows a bottom view of a modification of a light glare reducing device adapted to a street light or other light source.

FIG. 21 shows a cutaway side view, FIG. 22 shows a top view and FIG. 23 shows a bottom view of a modification of a light glare reducing device adapted to a street light or other light source. A modification of a light glare reducing device adapted to a street light or other light source could be turned sideways, upside down or any combination of same due to its sealed construction. Other light sources would include and not be limited to spot lights, utility lights and household light bulbs.

Prototype test model 40 or similar models could be adapted to fit and to be attached to any household, business or public use spotlight.

Since certain changes may, can and will be made in the above construction and different embodiments of the invention and could be made without departing from the scope of the invention herein involved, it is intended that all matter contained in the above description or shown in the accompanying drawings shall be interpreted as illustrative and not in a limiting sense.

OPERATION OF INVENTION

The light glare reducing device demonstrates the feasibility of a low glare headlight for automotive usage and low glare feasibility for other lights.

The starburst high glare of current automotive headlights 52 is not present with this light glare reducing device. The blinding effect to approaching drivers is reduced. The blinding effect to bicyclists, pedestrians, animals and all others is reduced.

In the light glare reducing device the center direct bulb illumination of the front side of the filament is directed into inner cylinder 30 along with some of the reflective light from the center rear portion of the reflective inside surface.

The outside area of the reflective inside surface reflects light from the bulb toward and into outer cylinder 32.

A solution or a diffusive light transmitting suspension, suspended solution or mixture of particle or substance suspending fluids, airs or gases in inner cylinder compartment 44 and in outer cylinder compartment 46 cuts or reduces the high glare and starburst effects of headlight 52 units much as a cloud will cut the glare of the sun. The total output of the light is reduced just as the brightness of the sun is reduced by a cloud. Therefore a brighter bulb or headlight 52 is required when projected through this invention to obtain the same amount of illumination.

The brightness of any headlight 52 has to be measured at inner cylinder face plate 36 and outer cylinder face plate 38 and not by the headlight 52 alone.

Since certain changes may, can and will be made with resulting improvements in a diffusive light transmitting suspension suspended solution or mixture of particle or substance suspending fluids, airs or gases without departing from the scope of the invention herein involved a one compartment light glare reducing device could result for automotive headlight 52 and other spotlight usages as could be used for a light bulb 60.

Protective designer shield 56 could be shortened from front to back to accommodate automobiles with sun roofs.

With a top to bottom slimness of the projected final product a light glare reducing device could be designed to mount on the hood of some automobiles.

Six light glare reducing devices could be manufactured together as one unit.

Six light glare reducing devices could also be manufactured together with protective designer shield 56. A closeable opening would be provided in the protective designer shield 56 to allow for the manufactured installation of headlights 52 and wiring harness and for maintenance of the same.

Compartments can be left slightly less than full to allow for any expansion of any fluids or liquids without affecting the working or the results of compartments or the entire light glare reducing device.

A low glare, no starburst light can be obtained from the following combinations;

(a) a 6 inch diameter cylinder 6 inches in length filled with a suspended solution of ¼ teaspoon of Cheer detergent to 3 quarts of water and using a spotlight of 200,000 candlepower. Although this works for a low glare, no starburst light it provides insufficient light for proper illumination of the roadway for safe driving.

Any water base without antifreezing additives will not work as intended due to weather temperature extremes of either cold or hot. These temperature extremes could easily damage a light glare reducing device due to expansion and contraction and the water base suspended solution would escape and the purpose and effect of a light glare reducing device would be defeated.

(b) a 6 inch diameter cylinder 2 inches in length filled with a suspended solution of 3 teaspoon of Liquid Gold furniture polish to 24 ounces of 70 percent isopropyl rubbing alcohol and using a H5001 Halogen high beam sealed beam automotive headlight 52.

Although this works for a low glare, no starburst light it provides insufficient light for proper illumination of the roadway for safe driving.

(c) a 2 inch diameter cylinder 5 inches in length with 7 pieces of ½ inch diameter PVC water pipe, 4 inches in length placed inside with a suspended solution of ⅛ teaspoon of Havoline Outboard Two-Cycle Engine Oil to 24 ounces of 70 percent isopropyl rubbing alcohol and using a H5001 Halogen high beam sealed beam automotive headlight 52. The cylinder is placed in the center of a 6 inch diameter cylinder over the center of the headlight 52.

Although this works for a low glare, no starburst light it provides insufficient light for proper illumination of the roadway for safe driving.

(d) I had a H5001 headlight 52 that burned brighter than other H5001 headlights 52 and I equalized the light and glare by replacing the ⅛ teaspoon of Havoline Outboard Two-Cycle Engine Oil to 24 ounces of 70 percent isopropyl rubbing alcohol solution with a ⅛ teaspoon of Havoline Outboard Two-Cycle Engine Oil to 16 ounces of 70 percent isopropyl rubbing alcohol solution.

Although this works for a low glare, no starburst light it provides insufficient light for proper illumination of the roadway for safe driving.

(e) With a 100 watt fog light, Wagner number 4537 or GE number 4537-2 bulb a low glare light is obtained with a 6 inch diameter outer cylinder 32, 3 inches in length, filled with a suspended solution of 3 teaspoon of Liquid Gold furniture polish to 24 ounces of 70 percent isopropyl rubbing alcohol. The 2 inch diameter inner cylinder 30 was made, 5 inches in length with 7 pieces of ½ inch diameter PVC water pipe, 4 inches in length placed inside with a suspended solution of ⅛ teaspoon of Havoline Outboard Two-Cycle Engine Oil to 16 ounces of 70 percent isopropyl rubbing alcohol.

Using H5001 high beam halogen headlights 52 glare is very low, however the lighting is not quite adequate for vehicle driving even though the short range side vision is improved. Should inner cylinder 30 be left empty, with or without the seven pieces of tubes 34, the result is a high glare unit that has as much or more glare then any current automotive headlight 52. A light glare reducing device will not be effective this way.

Variations can be made to the design to make modifications in results, such as making the outer cylinder 32 2½ inches long instead, as an example.

A 2 inch by 5 inch inner cylinder 30 with seven 4 inch pieces of ½ inch diameter inside of the cylinder using the ⅛ teaspoon to 24 ounce mixture and a H5001 headlight 52 results in a low glare no starburst light.

A 2 inch by 4 inch inner cylinder 30 with seven 3 inch pieces of ½ inch diameter inside of the cylinder using the ⅛ teaspoon to 24 ounce mixture and a H5001 headlight 52 results in a high glare starburst light.

A 2 inch by 6 inch inner cylinder 30 with seven 5 inch pieces of ½ inch diameter inside of the-cylinder using the ⅛ teaspoon to 24 ounce mixture and a H5001 headlight 52 results in a high glare starburst light.

Many other combinations of mixtures or suspended solutions as well as other containers or cylinders are sure to exist.

All measurements and structural designs are subject to changes and adaptations as for example, the round shape could be changed to a rectangular shape to accommodate rectangular shaped sealed beam headlights 52. The separate units could be combined to make a single unit. The lengths used could be changed to accommodate and to best use other various suspended solutions. An air or gas mixture or suspension could be used in place of fluids or liquids.

This product would be considered an after-market product before and after such time as vehicle manufacturers initiated the product into their designs.

A plastic, fiberglass or other material outer protective designer shield 56 is an outside shell to give the unit an acceptable appearance while protecting the individual light glare reducing devices, headlights 52, electrical connections 58 and the wiring harness.

The protective designer shield 56 also acts as a supporting and stabilizing base to hold everything together and in alignment and adjustment.

The protective designer shield 56 a streamline appearance and design to offer low wind resistance.

The bottom of the protective designer shield 56 could be designed to fit the roof contours of individual vehicle designs.

One problem that currently occurs on automotive headlights 52 is that snow and ice can build up on the headlights 52 and thereby restricting the light that is available. Since the light glare reducing devices would not have the sealed beam heat to help eliminate some or all of this snow or ice, wiper blades can and should be provided to eliminate this potential problem in cold climate regions. Small wiper units similar to units now available on some cars could be used.

On current vehicles the existing headlights 52 could be maintained so that the high beams are available should driving circumstances allow their safe usage and for a backup or reserve lighting system.

The use of this product would show consideration for approaching drivers visibility.

CONCLUSION, RAMIFICATIONS, AND SCOPE OF INVENTION

Thus the reader can see that the present light glare reducing device provides an improved low glare illumination device usable on any automobile or other vehicle for reducing headlight 52 glare to oncoming vehicles traveling along an adjacent path of travel as well as any and all vehicles traveling in any and all other directions as well as to bicyclists, pedestrians and animals.

The present light glare reducing device used in a single unit or in multiple units in any configuration could be adapted to fit and to be attached to any streetlight, any household, business or public use spotlight or lighting system.

The present light glare reducing device could be adapted and modified to be used with any household light bulb and other illumination devices.

Although the description above contains many specifications, these should not be construed as limiting the scope of the invention but as merely providing illustrations of some of the presently preferred embodiments of this invention. Many other variations are possible. For example, inner cylinder compartment 44 and outer cylinder compartment 46 can have other shapes, such as square, oval, triangular and so on; the two compartments could become one compartment with an improved suspension or suspended solution or mixture; an air or gas suspension or suspended solution or mixture could replace the fluid or liquid one; glass could be used as a construction material; the light glare reducing device could be mounted on a vehicle hood, inside the vehicle on the dash or attached to the underside of the roof, attached to the grill, in the grill, on the bumper, in the bumper, etc.

Thus the scope of the invention should be determined by the appended claims and their legal equivalents, rather than by the examples given or by the embodiments illustrated.

Since certain changes may be made in the above construction and different embodiments of the invention could be made without departing from the scope thereof, it is intended that all matter contained in the above description or shown in the accompanying drawings shall be interpreted as illustrative and not in a limiting sense, and that the claims are intended to cover all changes and modifications.

It is also to be understood that the following claims are intended to cover all of the generic and specific features of the invention which as a matter of language might be said to fall there between.

Having described my invention, which I claim as new and desire to secure by Letters Patent I claim:

1. A light glare reducing device for use in conjunction with a light source for reducing glare and blinding effects of the light source, the device comprising:

a. a first diffusive light transmitting medium;

b. a first compartment with a plurality of light transmitting surfaces adapted to be placed in a path of light emitted from the light source;

c. said first compartment being substantially filled with said first light transmitting medium such that the first light transmitting medium is disposed between said light transmitting surfaces of the first compartment;

d. a second diffusive light transmitting medium;

e. a second compartment with a plurality of light transmitting surfaces adapted to be placed in a path of light emitted from the light source;

f. said second compartment being substantially filled with said second light transmitting medium such that the second light transmitting medium is disposed between said light transmitting surfaces of the second compartment;

g. said first and second compartments being disposed adjacent to each other, and said first compartment having a different diffusivity than said second compartment.

2. The glare reducing device of claim 1, wherein the first light transmitting medium comprises a liquid.

3. The glare reducing device of claim 1, wherein the first light transmitting medium comprises a mixture of liquid and solid particles.

4. The glare reducing device of claim 3, wherein the first light transmitting medium comprises a mixture of liquid and gas.

5. A lighting system for providing light with a reduced glare, comprising:

a light source; and a light glare reducing device, the light glare reducing device comprising an inner compartment and an outer compartment, the inner compartment being disposed at least partially within the outer compartment;

the inner compartment having a first light transmitting surface adjacent to the light source and a second light transmitting surface spaced from the first light transmitting surface in a direction away from the light source;

the outer compartment having a third light transmitting surface adjacent to the light source and a fourth light transmitting surface spaced from the third light transmitting surface in a direction away from the light source;

a first diffusive light transmitting medium disposed within and substantially filling the inner compartment; and a second diffusive light transmitting medium disposed within and substantially filling the outer compartment.

6. A lighting system according to claim 5, wherein the first light transmitting surface is spaced from the second light transmitting surface a first distance, the third light transmitting surface is spaced from the fourth light transmitting surface a second distance, and the first distance is greater than the second distance.

7. A lighting system according to claim 6, wherein the first and third light transmitting surfaces are generally coplanar.

8. The lighting system according to claim 5, wherein the inner compartment is generally coaxial with the outer compartment.

9. The lighting system according to claim 8, wherein the inner compartment is cylindrical-shaped.

10. The lighting system according to claim 9, wherein the outer compartment is cylindrical-shaped.

11. The lighting system according to claim 5, further comprising a plurality of elongated subcompartments defined within the inner compartment, each subcompartment extending in a direction allowing light to pass therethrough from the first light transmitting surface to the second light transmitting surface.

12. The lighting system according to claim 11, wherein the first diffusive light transmitting material is disposed within said subcompartments.

13. A vehicular lighting system, comprising:

a headlight; and a glare reducing device positioned in front of the headlight, the glare reducing device comprising a first compartment, the first compartment having a first light transmitting surface disposed adjacent to the headlight and a second light transmitting surface spaced from the first light transmitting surface in a direction away from the headlight, the first compartment being substantially filled with a diffusive light transmitting medium such that the light transmitting medium is disposed between the first and second light transmitting surfaces;

wherein the glare reducing device further comprises a second compartment, the second compartment having a third light transmitting surface disposed adjacent to the headlight and a fourth light transmitting surface spaced from the third light transmitting surface in a direction away from the headlight, the second compartment being substantially filled with a diffusive light transmitting medium such that the light transmitting medium is disposed between the first and second light transmitting surfaces, said first and second compartments being disposed adjacent to each other.

14. The vehicular lighting system of claim 13, wherein said first compartment has a different diffusivity than said second compartment.

15. The vehicular lighting system of claim 14, wherein said first compartment is disposed partially within said second compartment.

16. The vehicular lighting system claim 14, wherein the first light transmitting surface is spaced from the second light transmitting surface a first distance, the third light transmitting surface is spaced from the fourth light transmitting surface a second distance, and the first distance is greater than the second distance.

17. A lighting system according to claim 16, wherein the first and third light transmitting surfaces are generally coplanar.

18. The lighting system according to claim 17, wherein the first and second compartments are cylindrical-shaped and are generally coaxial with each other.

19. The lighting system according to claim 14, further comprising a plurality of elongated subcompartments defined within the first compartment, each subcompartment extending in a direction allowing light to pass therethrough from the first light transmitting surface to the second light transmitting surface, the first diffusive light transmitting material being disposed within said subcompartments.

* * * * *